UNITED STATES PATENT OFFICE.

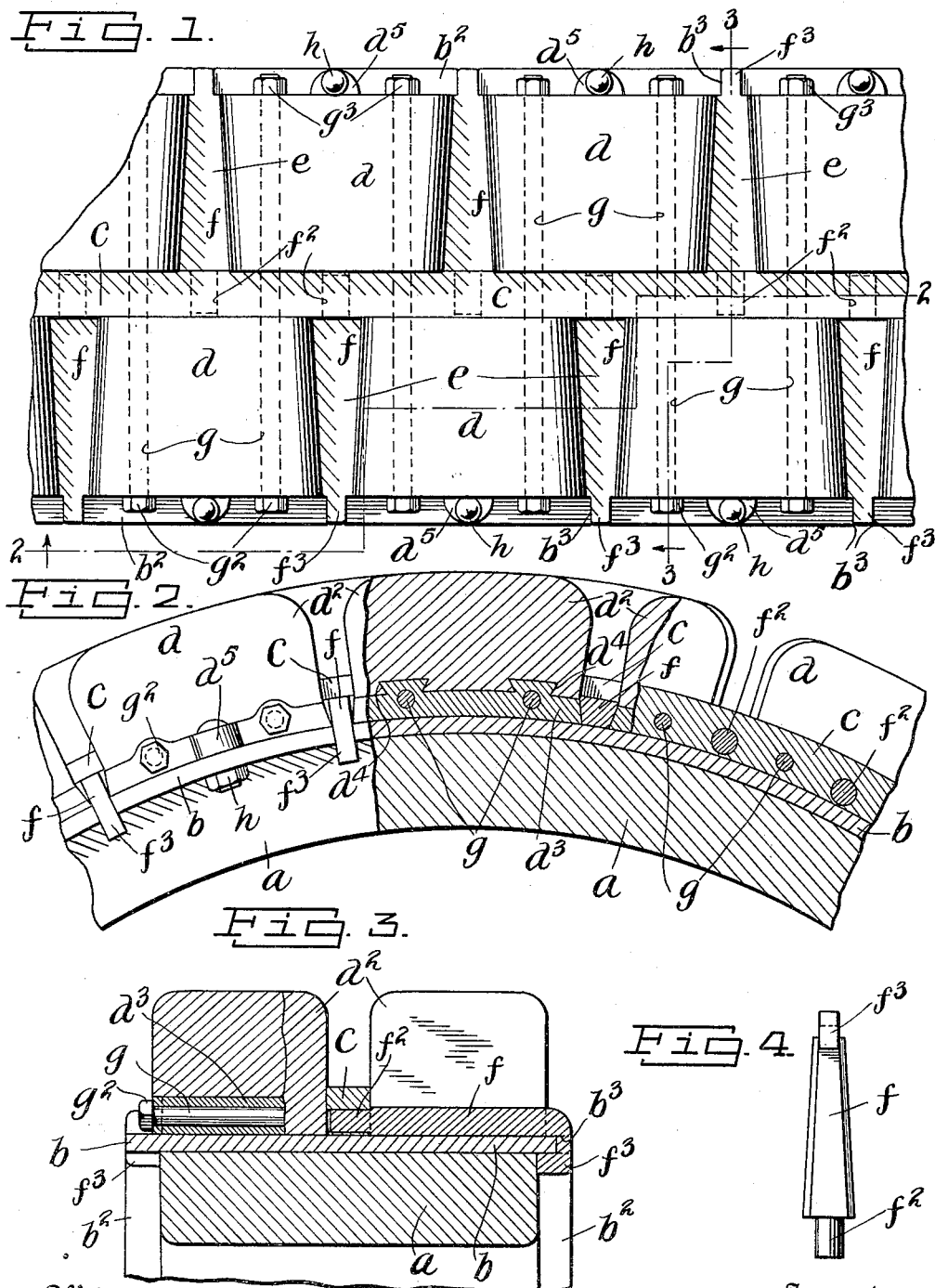

FRANK A. DELLERT, OF BROOKLYN, NEW YORK.

WHEEL RIM AND TIRE.

1,094,706.  Specification of Letters Patent.  Patented Apr. 28, 1914.

Application filed April 24, 1913. Serial No. 763,206.

*To all whom it may concern:*

Be it known that I, FRANK A. DELLERT, a citizen of the United States, and residing at Brooklyn, in the county of Kings and State of New York, have invented certain new and useful Improvements in Wheel Rims and Tires, of which the following is a specification, such as will enable those skilled in the art to which it appertains to make and use the same.

This invention relates to wheel rims and tires, and particularly to the rims and tires of wheels designed for use in connection with heavy vehicles, or vehicles designed to carry heavy loads; and the object thereof is to provide a wheel of this class, or a rim and tire construction of a wheel of this class, in which the tire is composed of rubber or other cushioning material and consists of separate series of blocks alternately arranged, the invention consisting particularly in the arrangement of said blocks, their form, and the method of or means for securing them to the rim of the wheel.

The invention is fully disclosed in the following specification of which the accompanying drawing forms a part in which the separate parts of my invention are designated by suitable reference characters in each of the views, and in which;—

Figure 1 is a face view of a part of my improved wheel rim and tire construction;—Fig. 2 a section on the line 2—2 of Fig. 1;—Fig. 3 a section on the line 3—3 of Fig. 1, and Fig. 4 an inner or under side view of a locking wedge which I employ.

In the drawing forming part of this specification, I have shown at $a$ a part of a rim of a wheel of the class herein referred to and which may consist of wood or any other suitable material and on which is mounted an annular band $b$ of steel or other suitable material and the band $b$ is of greater dimensions in transverse section than the rim $a$ whereby it is provided with side flanges $b^2$ which project slightly beyond the sides of said rim.

Mounted on the annular band $b$ and centrally thereof is a ring $c$ which is rectangular in transverse section, and on the opposite sides of the ring $c$ are placed separate series of tire blocks $d$ which are alternately arranged, as shown in Figs. 1 and 2, and which are composed of any suitable cushioning material such as, rubber or a fibrous substance or substances.

The tire blocks $d$ consist of an outer end portion $d^2$ and an inner plate member $d^3$ to which said body portion is secured preferably by a transverse tongue and groove construction, as shown at $d^4$. The blocks of the separate series of tire blocks are arranged alternately, as clearly shown in Fig. 1, and are tapered inwardly or toward the ring $c$ thus forming wedge-shaped spaces $e$ between the tire blocks of each series and in these wedge-shaped spaces are placed wedge-shaped locking devices $f$ which are tapered outwardly and provided at their inner ends with studs $f^2$ which enter corresponding transverse apertures in the ring $c$, and at their outer ends said locking devices $f$ are provided with downwardly directed hook members $f^3$ which pass through corresponding recesses $b^3$ in the side flanges $b^2$ of the annular band $b$, and which extend inwardly and securely engage said flanges. I also provide bolts $g$ which are passed transversely through the inner plates $d^3$ of the tire blocks $d$ and are provided at one end with heads $g^2$, and at the opposite end with nuts $g^3$, and these bolts are arranged in pairs, one pair passing through one of the blocks of one of the series forming the tire and through two of the blocks of the other series, as is also clearly shown in Figs. 1 and 2, and with this construction the separate blocks of the separate series of tire blocks which make up the tire of the wheel will be securely bound together and also securely bound to, or connected with, the annular band $b$ and rim $a$, said band being, of course, secured to said rim.

It will be understood, that the band $b$ forms, in effect, a part of the rim of the wheel, the tire consisting of the separate series of blocks $d$ formed as shown and described and connected and secured to the rim by means of the ring $c$, the wedge-shaped locking devices $f$ and the bolts $g$. The base plates $d^3$ of the tire block members $d$ may also be provided at their outer edges with projecting members $d^5$ through which are passed screws or bolts $h$ which serve as supplemental means for securing the tie blocks to the annular band $b$.

With my improvement any one of the tire block members including the parts $d^2$ and $d^3$ may be taken out or detached and new ones substituted therefor whenever necessary, and I thus provide a rim and tire construction for vehicles of the class specified involving all the cushioned effects usually desired in wheels of this class, and which may be easily repaired whenever necessary. It will also be seen that my improved wheel rim and tire construction may be made of any desired dimensions and strength; and changes in and modifications of the construction herein described may be made, within the scope of the appended claims, without departing from the spirit of my invention or sacrificing its advantages.

Having fully described my invention what I claim as new and desire to secure by Letters Patent is:—

1. In a wheel rim and tire construction, a central annular member mounted on the rim and separate series of tire blocks annularly and alternately arranged on said rim and on the opposite sides of said annular member, and means for securing said tire blocks to said rim and annular member consisting of bolts passed through said tire blocks and through said annular member, and locking devices passed transversely between the tire blocks of each series and the inner ends of which engage said annular member and the outer ends of which are provided with inwardly directed hooks which engage the rim.

2. In a wheel rim and tire construction, a central annular member mounted on the rim and separate series of tire blocks annularly and alternately arranged on said rim and on the opposite sides of said annular member, and means for securing said tire blocks to said rim and annular member consisting of bolts passed through said tire blocks and through said annular member, and locking devices placed transversely between the tire blocks of each series and the inner ends of which engage said annular member and the outer ends of which are provided with inwardly directed hooks which engage the rim, said tire blocks consisting of body portions of cushioning material and inner plates with which the body portions are connected and through which said bolts are passed.

3. A wheel rim provided with a ring which is mounted thereon centrally thereof, and a plurality of tire blocks mounted in separate series on the opposite sides of said ring, said tire blocks consisting of body portions of cushioning material and base plate members connected therewith, said tire blocks being also tapered and the narrower ends thereof being directed inwardly, and said tire blocks being secured in position by bolts passed through the base plate members thereof and through said ring, and wedge-shaped locking devices placed between the tire blocks of each series and the inner ends of which are provided with bearings in said ring and the outer ends of which are provided with inwardly directed hook members which overlap the sides of the rim.

4. In a wheel rim and tire construction, an annular plate member mounted on the rim, an annular band mounted centrally on said annular plate member, annular series of tire blocks mounted on the annular plate member and on the opposite sides of said band member and alternately arranged bolts passed transversely through the tire blocks and through said band member, and locking devices placed between the blocks of each series and engaging the band member and the edges of the annular plate member.

5. In a wheel rim and tire construction, an annular plate member mounted on the rim, an annular band mounted centrally on said annular plate member, annular series of tire blocks mounted on the annular plate member and on the opposite sides of said band member and alternately arranged bolts passed transversely through the tire blocks and through said band member, and locking devices placed between the blocks of each series and engaging the band member and the edges of the annular plate member, the said tire blocks and said locking devices being tapered or wedge-shaped in form.

In testimony that I claim the foregoing as my invention I have signed my name in presence of the subscribing witnesses this 23rd day of April 1913.

FRANK A. DELLERT.

Witnesses:
C. MULREANY,
S. ANDREWS.

---

Copies of this patent may be obtained for five cents each, by addressing the "Commissioner of Patents, Washington, D. C."